United States Patent
Gröhlich et al.

(10) Patent No.: US 9,768,920 B2
(45) Date of Patent: Sep. 19, 2017

(54) METHOD FOR TRANSFERRING CONTROL SIGNALS AND DATA SIGNALS, CIRCUIT CONFIGURATION FOR TRANSFERRING AND RECEIVING

(75) Inventors: Klaus Gröhlich, Zirndorf-Weiherhof (DE); Ronald Hain, Oberasbach (DE); Sebastian Randel, München (DE); Götz Roderer, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 259 days.

(21) Appl. No.: 13/383,803

(22) PCT Filed: Jul. 9, 2010

(86) PCT No.: PCT/EP2010/059859
§ 371 (c)(1),
(2), (4) Date: Jul. 12, 2012

(87) PCT Pub. No.: WO2011/006839
PCT Pub. Date: Jan. 20, 2011

(65) Prior Publication Data
US 2012/0269208 A1    Oct. 25, 2012

(30) Foreign Application Priority Data
Jul. 13, 2009   (DE) ................. 10 2009 032 843

(51) Int. Cl.
*H04L 5/00* (2006.01)
*H04L 12/413* (2006.01)
*H04L 12/803* (2013.01)

(52) U.S. Cl.
CPC .......... *H04L 5/0007* (2013.01); *H04L 12/413* (2013.01); *H04L 47/125* (2013.01)

(58) Field of Classification Search
CPC ...................................................... H04L 5/0007
See application file for complete search history.

(56) References Cited

U.S. PATENT DOCUMENTS

| 4,641,322 A | 2/1987 | Hasegawa |
| 5,754,949 A * | 5/1998 | Kumagai et al. .......... 455/115.1 |
| 7,295,518 B1 | 11/2007 | Monk et al. |
| 2002/0039388 A1* | 4/2002 | Smart et al. .................. 375/260 |

(Continued)

FOREIGN PATENT DOCUMENTS

| DE | 41 07 732 A1 | 9/1992 |
| DE | 103 01 637 | 7/2004 |

(Continued)

OTHER PUBLICATIONS

Multiplexverfahren; http://de.wikipedia.org/w/index.php?title=Multiplexverfahren&oldid=61550929&prin . . . pp. 1 to 9; Nov. 13, 2012 revised on Jun. 25, 2009.

(Continued)

*Primary Examiner* — Jason Mattis
(74) *Attorney, Agent, or Firm* — Cozen O'Connor

(57) ABSTRACT

A method for transferring control signals and data signals, particularly in a motor vehicle. The control signals and the data signals are transferred by a physical medium. The control signals or the data signals are modulated prior to transferring. The modulated signals and the non-modulated signals are sent by the physical medium.

9 Claims, 3 Drawing Sheets

(56) References Cited

U.S. PATENT DOCUMENTS

| | | |
|---|---|---|
| 2004/0015630 A1 | 1/2004 | Boolos |
| 2005/0206240 A1* | 9/2005 | Enders |
| 2007/0053374 A1* | 3/2007 | Levi .............................. 370/431 |
| 2011/0188541 A1* | 8/2011 | Kennedy et al. ............. 375/130 |

FOREIGN PATENT DOCUMENTS

| | | |
|---|---|---|
| DE | 103 01 637 A1 | 7/2004 |
| EP | 1 383 280 | 1/2004 |
| EP | 1 383 280 A1 | 1/2004 |

OTHER PUBLICATIONS

Orthogonales Frequenzmultiplexverfahren; http://de.wikipedia.org/w/index.php?title=Orthogonales_Frequenzmultiplexverfahren&olid=61831174 pp. 1 to 7; Nov. 13, 2012 revised on Jul. 3, 2009.

* cited by examiner

METHOD FOR TRANSFERRING CONTROL
SIGNALS AND DATA SIGNALS, CIRCUIT
CONFIGURATION FOR TRANSFERRING
AND RECEIVING

CROSS REFERENCE TO RELATED APPLICATION

This is a U.S. national stage of application No. PCT/EP2010/059859, filed on 9 Jul. 2010. Priority is claimed on German Application No. 10 2009 032 843.2 filed 13 Jul. 2009, the content of which is incorporated here by reference.

BACKGROUND OF THE INVENTION

1. Field of the Invention

The invention relates to a method for transferring control signals and data signals, a circuit configuration for transferring control signals and data signals, and a circuit configuration for receiving control signals and data signals.

2. Description of Prior Art

In the prior art, different methods are known in which control signals and data signals are transferred within a motor vehicle. For example, it is known to transfer control signals and data signals in the motor vehicle by an internet protocol. In this method, the control signals and data signals are packaged into data packets, transferred and unpacked again at the receiver.

SUMMARY OF THE INVENTION

An object of one embodiment of the invention is to provide an improved method for transferring control signals and data signals, an improved circuit configuration for transferring control signals and data signals, and an improved circuit configuration for receiving control signals and data signals.

An advantage of the method and the circuit configuration according to one embodiment of the invention is the fact that control signals and data signals are transferred with little technical complexity by the same physical medium and in addition, an increased data transfer rate is possible.

Costs can be saved by this method since the transfer of the data and control signals is carried out with only one cable. Weight is saved on the vehicle, in particular in the cable harness.

The control signals and/or the data signals are transferred with the same physical medium, wherein prior to transferring, the control signals and/or the data signals are modulated. The modulated and any non-modulated signals are sent by the same physical medium, i.e. the same electrical or optical cable. On the receiver side, the modulated and non-modulated control signals and data signals are received and demodulated in an appropriate manner. The transfer can thus take place over a common physical medium, in particular over a single cable.

In a further embodiment, frequency modulation is used as the modulation to modulate the control signals and/or the data signals with different or differentiable frequency signals, to transfer them and to demodulate them again appropriately on the receiver side. Frequency modulation represents a secure and known method suitable for an efficient and inexpensive modulation of the control signals and/or the data signals.

In a further embodiment a time-multiplexing method is used as the modulation, with which the data signals and the control signals are modulated prior to the transfer and after the transfer are appropriately demodulated. The use of the time-multiplexing method offers an additional secure and reliable modulation method for transferring the control signals and data signals over a single physical medium, wherein a secure separation of the modulated signals is possible at the receiver. A high level data security is therefore guaranteed.

In a further embodiment, the control signals and/or the data signals are modulated prior to the transfer using orthogonal frequency modulation (OFDM). Orthogonal frequency modulation offers a high data density with a reliable modulation and a reliable demodulation.

In a further embodiment, prior to the transfer the control signals and the data signals are converted into a digital data stream by a time-multiplexing method, wherein the digital data stream is subsequently frequency modulated and then transferred. At the receiver the frequency modulated data stream is first frequency-demodulated and then by a second demultiplexing method, split up into the data signals and the control signals again. This method offers an additional improvement in the data transfer of the control signals and data signals by a single physical medium.

In a further embodiment, digital control signals and digital data signals are modulated and converted into an analog signal prior to the transfer. The analog signal is digitized on the receiver side and then via a demodulation process, converted back again into digital control signals and data signals. This embodiment offers a further improvement in the data transfer of the control signals and data signals by a physical medium.

BRIEF DESCRIPTION OF THE DRAWINGS

The invention will be explained in further detail below with the aid of the figures. These show.

DETAILED DESCRIPTION OF THE PREFERRED EMBODIMENTS

Figure 1:
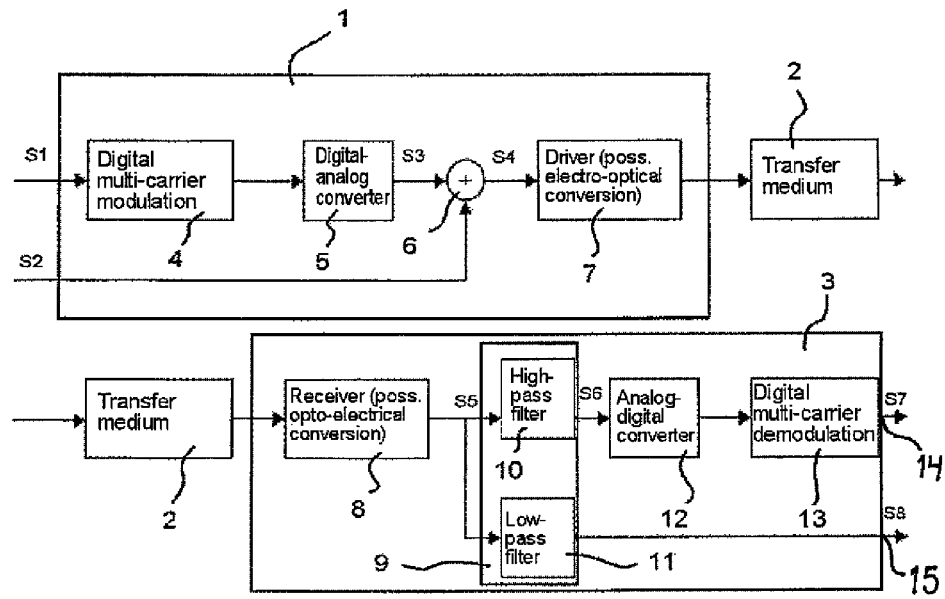
FIG. 1 is a first embodiment for transferring control signals and data signals.

FIG. 1 shows, in a schematic view, a first embodiment for transferring control signals and data signals, which is used in particular in a motor vehicle. Control signals and data signals are transferred between control devices of a motor vehicle and/or between a control device and a control element of the motor vehicle. A first circuit configuration 1 is provided, to which the control signals 82 and the data signals S1 are fed. The control signals S2 and data signals S1 are conditioned by the first circuit configuration 1 and transferred via a transfer medium 2. The transfer medium 2 is, for example, a single physical medium in the form of a signal conductor or a cable with an electrical or optical conductor. The transfer medium 2 can also be implemented as an optical fiber waveguide or in the form of radio waves. The transfer medium can be formed as a screened or unscreened electrical cable, a two-wire cable, in particular a twisted pair cable, a coaxial cable or an optical cable, for example a polymer fiber or an optical fiber waveguide with an optical core made of quartz glass.

The transfer medium 2 is connected to a second circuit configuration 3, which conditions the received control and data signals and outputs the control signals S8 and data signals S7. The first and the second circuit configuration 1, 3 can be connected to control devices and/or to control elements and/or to data transfer units, from which the data signals and control signals are supplied or to which the data signals and control signals are transmitted.

The digital data signals can be provided, for example, by a fast Ethernet or a gigabit Ethernet of the on-board network of the motor vehicle. The first circuit configuration 1 comprises a first modulation unit 4, to which the data signals S1 are fed. The data signals S1 appear as digital data signals and are converted by the first modulation unit 4 by a digital multi-carrier modulation method into modulated data signals.

The digital data signal is modulated by the first modulation unit 4 with multiple carrier frequencies. The first modulation unit 4 preferably modulates the data signal with an OFDM frequency multiplexing method (orthogonal frequency division multiplex) or with a discrete multi-tone (DMT) method. The OFDM method is a special implementation of a multi-carrier modulation that uses multiple orthogonal carrier signals for digital data transfer. The discrete multi-tone modulation method is a multi-carrier method, in which a predetermined frequency band is subdivided into multiple sub-channels. Up to 255 carrier frequencies can then be used for data, which each have a bandwidth of 4.312 kHz.

The bit information is modulated onto the signal in individual carriers by quadrature amplitude modulation.

The modulated data signal is then fed to a D/A converter 5, which transforms the modulated data signal into a modulated analog data signal S3 and feeds it to an adding unit 6. The digital control signal S2 is fed to the adding unit 6 at the same time, for example by a CAN bus or a Flex-Ray. The adding unit 6 then outputs a mixed signal S4 that comprises both the data signal and the control signal. The data signal and the control signal are transferred in different frequency ranges. The control signal can be located in the baseband, for example in a statically or dynamically defined band.

The adding unit 6 outputs the mixed signal S4 to a transmitting unit 7. The transmitting unit 7 sends the mixed signal over the transfer medium 2. The transmitting unit 7 is implemented in such a manner as to transfer the mixed signal over the existing transfer medium. The transmitting unit 7 has, for example, an electro-optical transducer if the transfer medium is an optical fiber waveguide.

The transfer medium 2 feeds the signal to a receiving unit 8 of the second circuit configuration 3. The receiving unit 8 receives the signal and converts it back into the mixed signal S5, which corresponds to the mixed signal S4 at the output of the mixer 6. The received mixed signal S5 is passed to a filter 9, which separates the data signals from the control signals. In the selected embodiment the filter 9 comprises a high-pass filter 10 and a low-pass filter 11. The high-pass filter 10 is implemented such that the received analog data signal SE is filtered out of the received mixed signal S5. The received analog data signal S6 is fed to an A/D converter 12, which converts the analog data signal into a digital data signal and feeds it to a first demodulation unit 13. The demodulation unit 13 demodulates the supplied digital data signal with the inverse modulation method to that used by the first modulation unit 4. The demodulation unit 13 outputs the demodulated data signal S7 via a first output 14.

The low-pass filter 11 filters the received control signal S8 out of the received mixed signal S5 and outputs the filtered signal S8 via a second output 15.

In this method the control signal (e.g. Can) and the data signal are decoupled at a data signal node by means of a low-pass. This means that it is possible to evaluate the data signals at a node while the control signal remains unchanged on an equipotential bus.

Figure 2A:
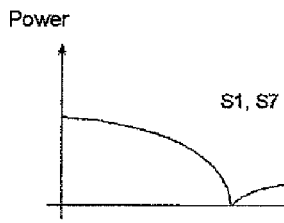
FIGS. 2A-2D are graphs of the control signals and data signals in the different sections of the transfer method of FIG. 1.
Figure 2B:
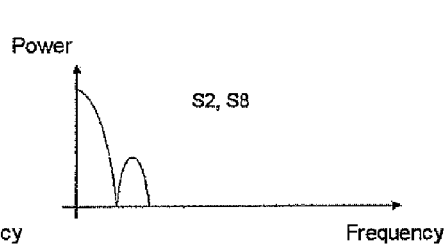
Figure 2C:
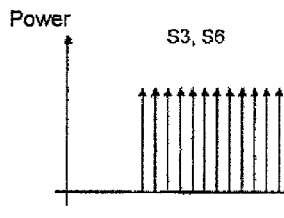
Figure 2D:
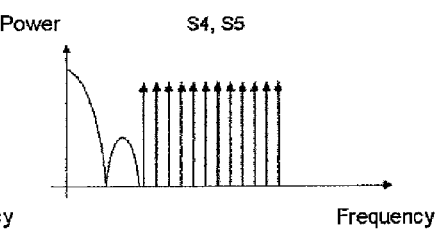

FIG. 2A shows, in a diagram in which the power is plotted against the frequency, the data signal S1 at the input of the circuit configuration 1 and the data signal S7 at the output of the second circuit configuration 3. FIG. 2B shows, in a diagram in which the power is plotted against the frequency, the control signal S2 at the input of the first circuit configuration 1 and the control signal S8 at the output of the second circuit configuration 3. FIG. 2C shows the data signal S3 at the input of the adding unit 6 and the data signal S6 at the output of the high-pass filter 10. FIG. 2D shows the mixed signal S4 at the output of the adding unit 6 and the received signal S5 at the output of the receiving unit 8.

Figure 3:
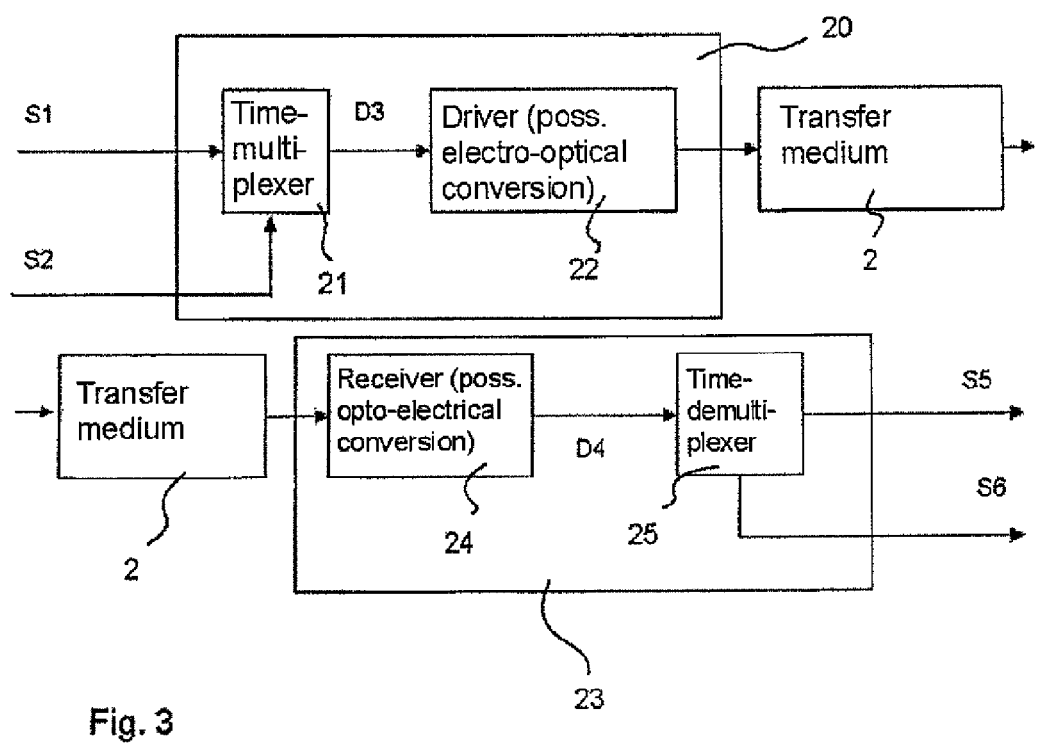
FIG. 3 is a further embodiment for transferring the control signals and data signals.

FIG. 3 shows the second embodiment of an arrangement for transferring control signals and data signals, for example in a motor vehicle. In this case the data signals S1 and the control signals S2 are fed to a third circuit configuration 20. The third circuit configuration 20 comprises a time-multiplexing unit 21 to which the data signals and the control signals are fed. The digital control signal fed in (e.g. from a LIN bus) and the digital data signal fed in (e.g. from an Ethernet) are combined by the time-multiplexing unit 21 by means of a time-multiplexing method into a digital data stream D3. If e.g. a fast Ethernet data signal at 100 Mb/s and a LIN bus control signal at 20 Kb/s are combined, then after every 500th data bit of the Ethernet data stream a control bit from the LIN bus control signal is inserted. The digital data stream D3 is then fed to a second transmitting unit 22. The second transmitting unit 22 sends the supplied digital data stream D3 over the transfer medium 2 to a fourth circuit configuration 23. The fourth circuit configuration 23 comprises a second receiving unit 24 which is connected to the transfer medium 2 and receives the transferred signals. The second receiving unit 24 converts the received signal back into a digital data stream D4. The digital data stream D4 is fed by the second receiving unit 24 to a time-demultiplexing unit 25. The time-demultiplexing unit 25 determines the data signal S5 and the control signal S6 from the digital data stream and outputs them.

The second transmitting unit 22 and the second receiving unit 24 can comprise electro-optical or opto-electrical transducers, in order to match the data stream to the existing physical transfer medium for transferring.

Figure 4:
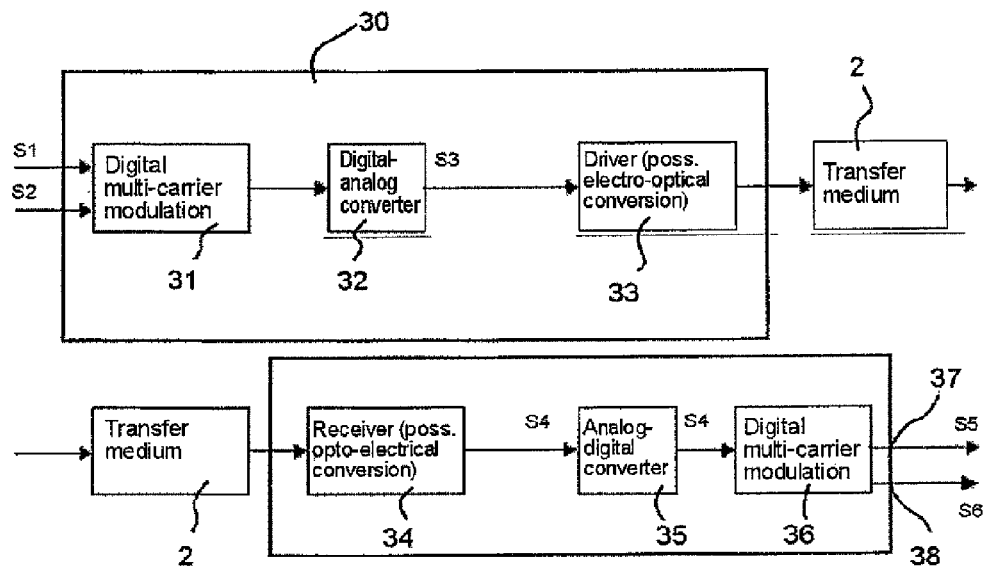
FIG. 4 is a third embodiment for transferring the control signals and data signals.

FIG. 4 shows a third embodiment for transferring control signals and data signals. The digital data signals S1 from e.g. an Ethernet and the digital control signals S2, from e.g. a LIN bus, are fed to a fifth circuit configuration 30. The fifth circuit configuration 30 comprises a second modulation unit 31 in which the digital control signal S2 and the digital data signal S1 are combined into a digital data stream, e.g. by a frequency multiplexing method. In the modulation method for example either an OFDM or a DMT method is used.

If, for example, a fast Ethernet data signal at 100 Mb/s and a LIN bus control signal at 20 Kb/s are transferred together, then the transfer takes place, for example, on 512 electrical carrier frequencies. In this case the Ethernet data signal is transferred on 511 carrier frequencies and the LIN bus control signal on one carrier frequency. The second modulation unit 31 forwards a frequency modulated data stream to a second D/A converter 32. The second D/A converter 32 converts the digital data stream into an analog signal S3 and forwards this to a third transmitting unit 33. The third transmitting unit 33 can comprise an electro-optical transducer. The third transmitting unit 33 sends the supplied data stream over the transfer medium 2 to a third receiving unit 34 of a sixth circuit configuration 39. The third receiving unit 34 can comprise an opto-electrical transducer. The third receiving unit 34 forwards the received data stream S4 to a second A/D converter 35. The second A/D converter converts the analog received signal into a digital data signal and forwards this to a second demodulation unit 36. From the digital data stream fed to it, the second demodulation unit 36 determines the analog data signal S5 and the analog control signal S6, using a corresponding reverse demodulation method in accordance with the modulation method used by the second modulation unit 31. The sixth circuit configuration outputs the analog data signal S5 and the analog control signal S6 via additional outputs 37, 38.

Figure 5A:
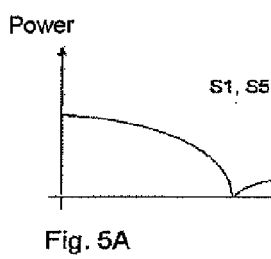
FIGS. 5A-5C are graphs of the control signals and data signals in different sections of the transfer method of FIG. 4.

FIG. 5A shows, in a diagram in which the power is plotted against the frequency, the digital data signal S1 at the input of the fifth circuit configuration 30 and the digital data signal S5 at the output of the fifth circuit unit 39.

Figure 5B:
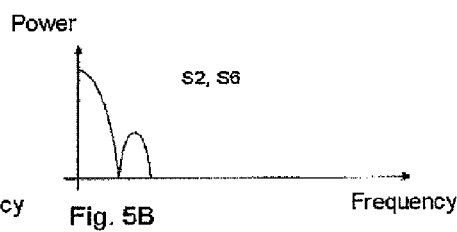

FIG. 5B shows, in a diagram in which the power is plotted against the frequency, the control signal S2 at the input of the fourth circuit configuration 30 and the control signal S6 at the output of the fifth circuit configuration 39.

Figure 5C:
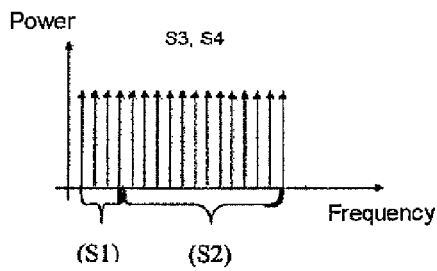

FIG. 5C shows, in a diagram in which the power is plotted against the frequency, the digital data stream S3 at the output of the second D/A converter 32 and the n-th data stream S4 at the input of the second A/D converter 35.

The methods and arrangements described for transferring the control and data signals can be used, as already stated, in a motor vehicle or in the field of industrial communication. For example, a joint transfer of a CAN bus signal and a Profinet signal can take place.

If the transfer medium 2 is implemented in the form of an optical fiber waveguide, an electro-optical conversion is necessary before and after the transfer medium 2, since the data signals and control signals exist in the form of an electrical signal.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for transferring unmodulated control signals and modulated data signals, in a motor vehicle, comprising:
    modulating, by a discrete multi-tone (DMT) method, the data signals to produce DMT modulated data signals;
    applying digital to analog conversion to the DMT modulated data signals to produce modulated analog data signals;
    adding, using an adder circuit, the modulated analog data signals to the unmodulated control signals to produce a mixed signal comprising both the modulated analog data signals and, in a dynamically defined baseband, the unmodulated control signals; and
    transmitting the mixed signal over a same physical medium.

2. The method as claimed in claim 1, wherein the modulation is frequency modulation.

3. The method as claimed in claim 1, wherein the unmodulated control signals and the data signals are transferred in different frequency ranges.

4. The method as claimed in claim 1, wherein the physical medium is a cable.

5. A method for receiving at least one or more of transmitted unmodulated control signals and modulated transmitted data signals, comprising
    receiving, over a physical medium, a transmitted signal that includes the transmitted unmodulated control signals in a dynamically defined baseband and the modulated transmitted data signals;
    converting the received transmitted signal into a mixed signal comprising both the modulated data signals and the unmodulated control signals;
    filtering the mixed signal to separate the modulated data signals from the unmodulated control signals in the dynamically defined baseband;
    applying analog to digital conversion to the filtered modulated data signals to produce discrete multi-tone (DMT) digital modulated data signals; and
    demodulating the DMT digital modulated data signals.

6. The method as claimed in claim 5, wherein frequency demodulation is used for the demodulation.

7. The method as claimed in claim 5, wherein the physical medium is a cable.

8. A circuit configuration configured to transfer unmodulated control signals and modulated data signals, in a motor vehicle, comprising:
    a modulation unit configured to modulate, by a discrete multi-tone (DMT) method, the data signals to produce DMT modulated data signals;
    a digital to analog converter configured to convert the DMT modulated data signals to produce modulated analog data signals;
    an adder configured to add the modulated analog data signals to the unmodulated control signals to produce a mixed signal comprising both the modulated analog data signals and, in a dynamically defined baseband, the unmodulated control signals; and
    a transmitter configured to transmit the mixed signal over a same physical medium.

9. A circuit configuration configured to receive at least one of transmitted unmodulated control signals and modulated transmitted data signals, comprising:
    a receiving unit configured to receive, over a physical medium, a transmitted signal that includes the transmitted unmodulated control signals in a dynamically defined baseband and the modulated transmitted data signals;
    a converter configured to convert the received transmitted signal into a mixed signal comprising both the modulated data signals and the unmodulated control signals;
    a filter configured to filter the mixed signal to separate the modulated data signals from the unmodulated control signals in the dynamically defined baseband;

an analog to digital converter configured to convert the filtered modulated data signals to produce discrete multi-tone (DMT) digital modulated data signals; and a demodulation unit configured to demodulate the DMT digital modulated data signals.

\* \* \* \* \*